United States Patent
Chang et al.

(10) Patent No.: US 7,269,647 B2
(45) Date of Patent: Sep. 11, 2007

(54) SIMPLIFIED NETWORK PACKET ANALYZER FOR DISTRIBUTED PACKET SNOOPER

(75) Inventors: Ching-Jye Chang, Austin, TX (US); Lorin Evan Ullmann, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1134 days.

(21) Appl. No.: 09/738,334

(22) Filed: Dec. 15, 2000

(65) Prior Publication Data

US 2002/0078231 A1    Jun. 20, 2002

(51) Int. Cl.
*G06F 15/173* (2006.01)

(52) U.S. Cl. .................................... 709/224

(58) Field of Classification Search ........ 709/220–224, 709/201–203, 238–239, 229–231; 345/736, 345/738; 370/248, 252, 254; 717/148
See application file for complete search history.

(56) References Cited

U.S. PATENT DOCUMENTS

| | | | |
|---|---|---|---|
| 5,193,110 A | 3/1993 | Jones et al. .................. 379/94 |
| 5,630,061 A | 5/1997 | Richter et al. ......... 395/200.02 |
| 5,724,508 A | 3/1998 | Harple, Jr. et al. ..... 395/200.04 |
| 5,787,253 A * | 7/1998 | McCreery et al. .......... 709/231 |
| 5,826,014 A | 10/1998 | Coley et al. ........... 395/187.01 |
| 5,845,093 A | 12/1998 | Fleming ................ 364/726.07 |
| 5,870,719 A | 2/1999 | Maritzen et al. .............. 705/26 |
| 5,872,977 A | 2/1999 | Thompson .................. 395/703 |
| 5,901,286 A | 5/1999 | Danknick et al. ...... 395/200.33 |
| 5,923,885 A | 7/1999 | Johnson et al. ............. 395/712 |
| 5,964,852 A | 10/1999 | Overton ....................... 710/62 |
| 5,991,830 A | 11/1999 | Beard et al. .................. 710/18 |
| 6,061,713 A | 5/2000 | Bharadhwaj ................ 709/203 |
| 6,063,128 A | 5/2000 | Bentley et al. ................ 703/6 |
| 6,078,948 A | 6/2000 | Podgorny et al. ........... 709/204 |
| 6,182,226 B1 | 1/2001 | Reid et al. .................. 713/201 |
| 6,202,156 B1 | 3/2001 | Kalajan ..................... 713/201 |
| 6,219,706 B1 | 4/2001 | Fan et al. ................... 709/225 |
| 6,243,667 B1 | 6/2001 | Kerr et al. ..................... 703/27 |
| 6,317,837 B1 | 11/2001 | Kenworthy ................. 713/200 |
| 6,453,419 B1 | 9/2002 | Flint et al. .................. 713/201 |
| 6,493,752 B1 | 12/2002 | Lee et al. .................... 709/223 |
| 6,611,499 B1 * | 8/2003 | D'Souza ..................... 370/252 |
| 6,715,080 B1 | 3/2004 | Starkovich et al. ......... 713/201 |
| 6,751,677 B1 | 6/2004 | Ilnicki et al. ............... 709/316 |
| 6,754,831 B2 | 6/2004 | Brownell .................... 713/201 |
| 6,874,086 B1 * | 3/2005 | Gu et al. ..................... 713/168 |
| 7,013,296 B1 * | 3/2006 | Yemini et al. ................. 705/77 |
| 7,028,051 B1 | 4/2006 | McMullan et al. |
| 7,140,039 B1 * | 11/2006 | Yemeni et al. .................. 726/9 |
| 2002/0023210 A1 | 2/2002 | Tuomenoksa et al. ...... 713/161 |

* cited by examiner

*Primary Examiner*—Andrew Caldwell
*Assistant Examiner*—Douglas Blair
(74) *Attorney, Agent, or Firm*—Duke W. Yee; Jeffrey S. LaBaw; Wayne P. Bailey

(57) ABSTRACT

A method, system, apparatus, and computer program product are presented for a dynamically locatable packet analyzer spread across a distributed network of endpoints for determining packet generating applications is provided. In particular, the analyzer determines which ports are being used by which applications in order to verify that only intended packets are being sent and received by endpoints. The analyzer also provides novice packet snooping by not requiring administrators to configure operating system specific, packet specific or port specific information. The analyzer also provides snooping per application type (i.e. security, discovery, etc.) on endpoints, rather than packet type or port only.

4 Claims, 8 Drawing Sheets

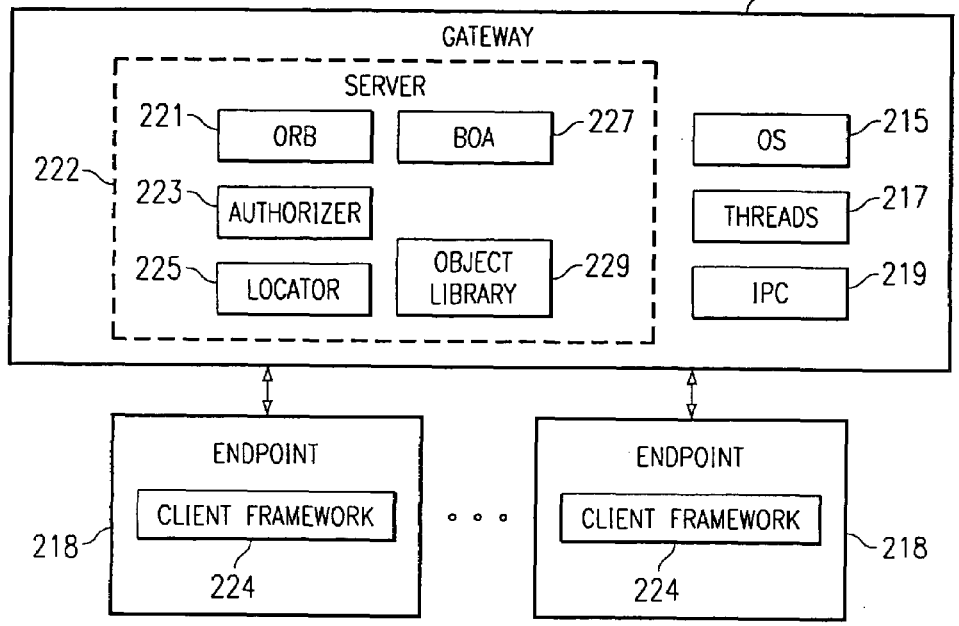
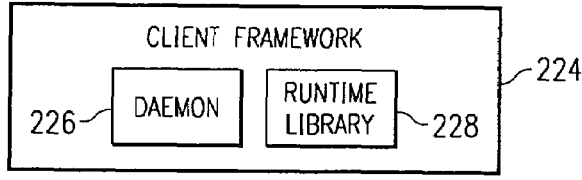
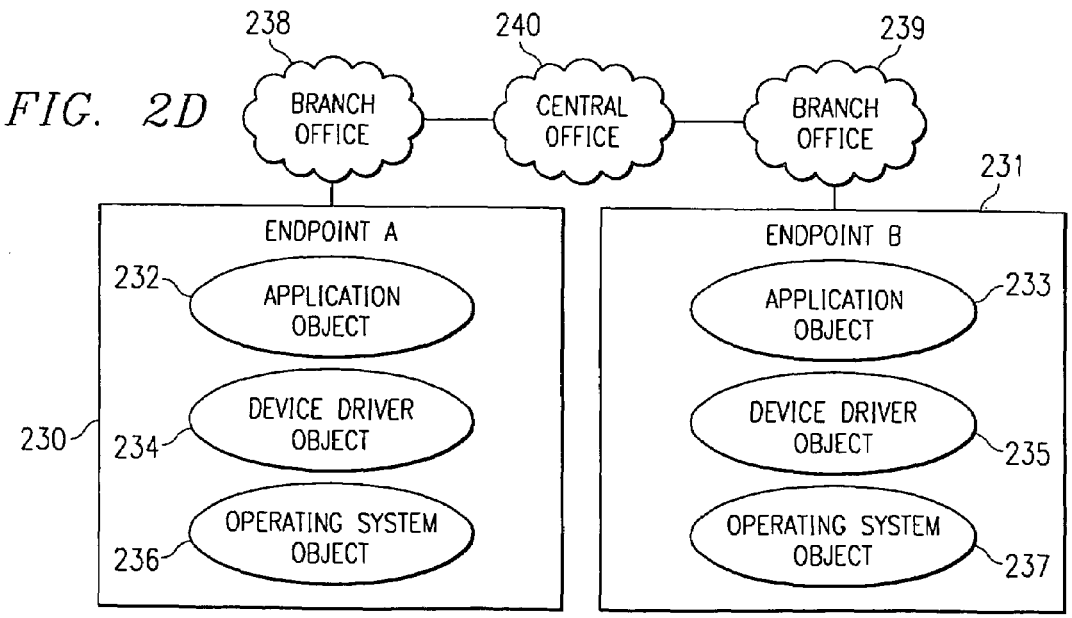

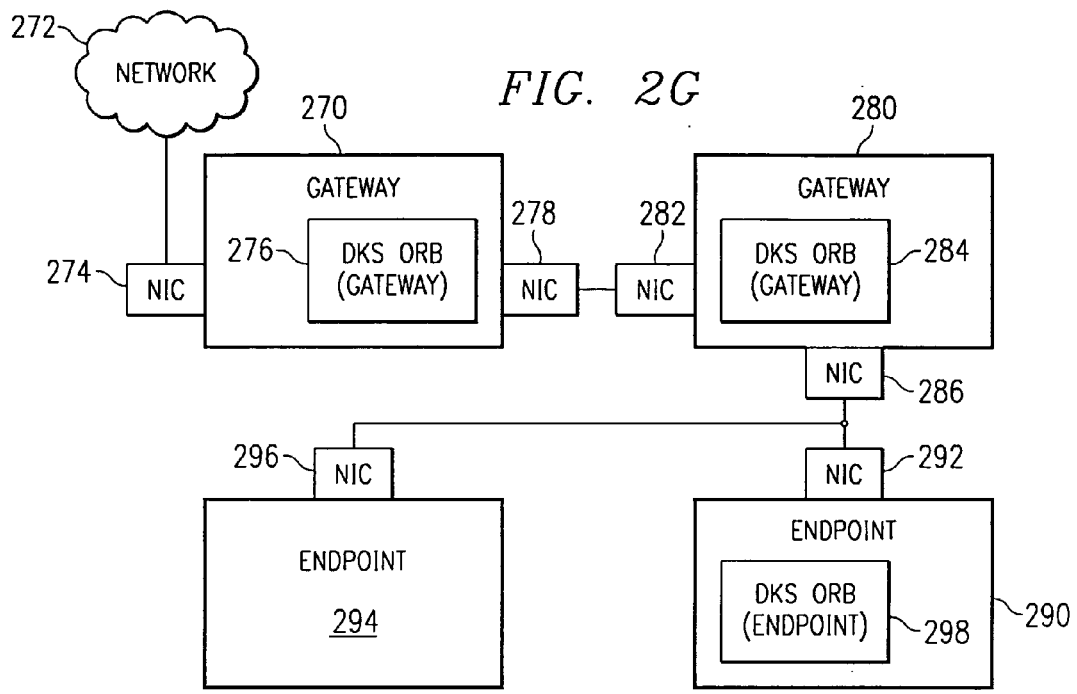
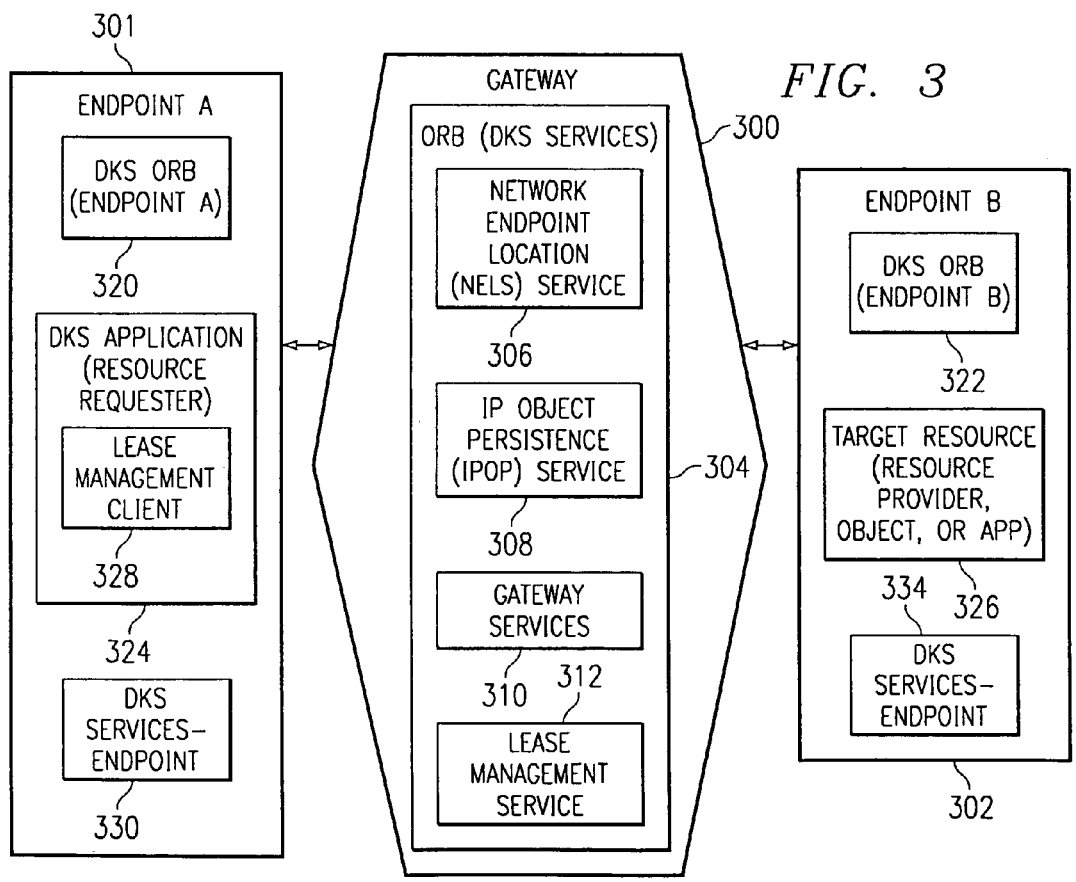

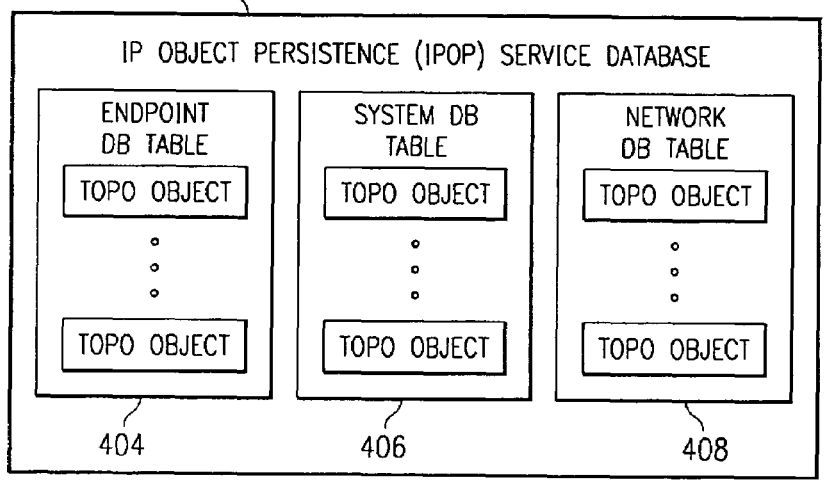
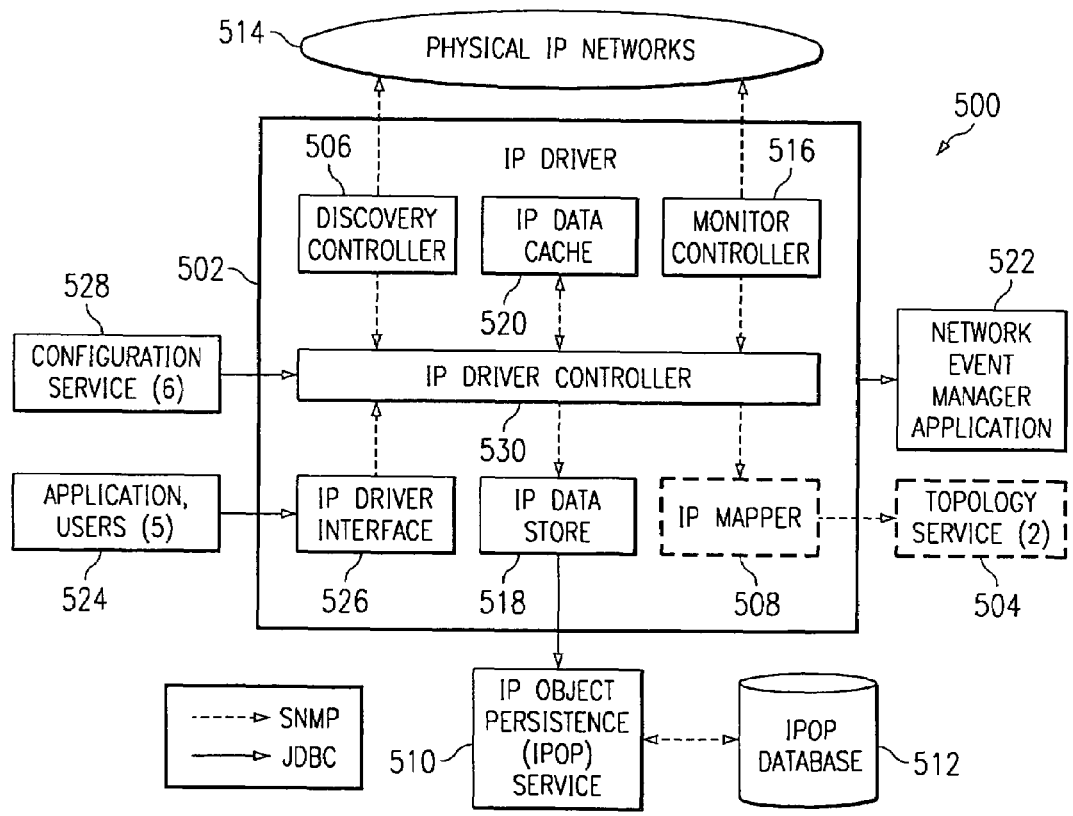

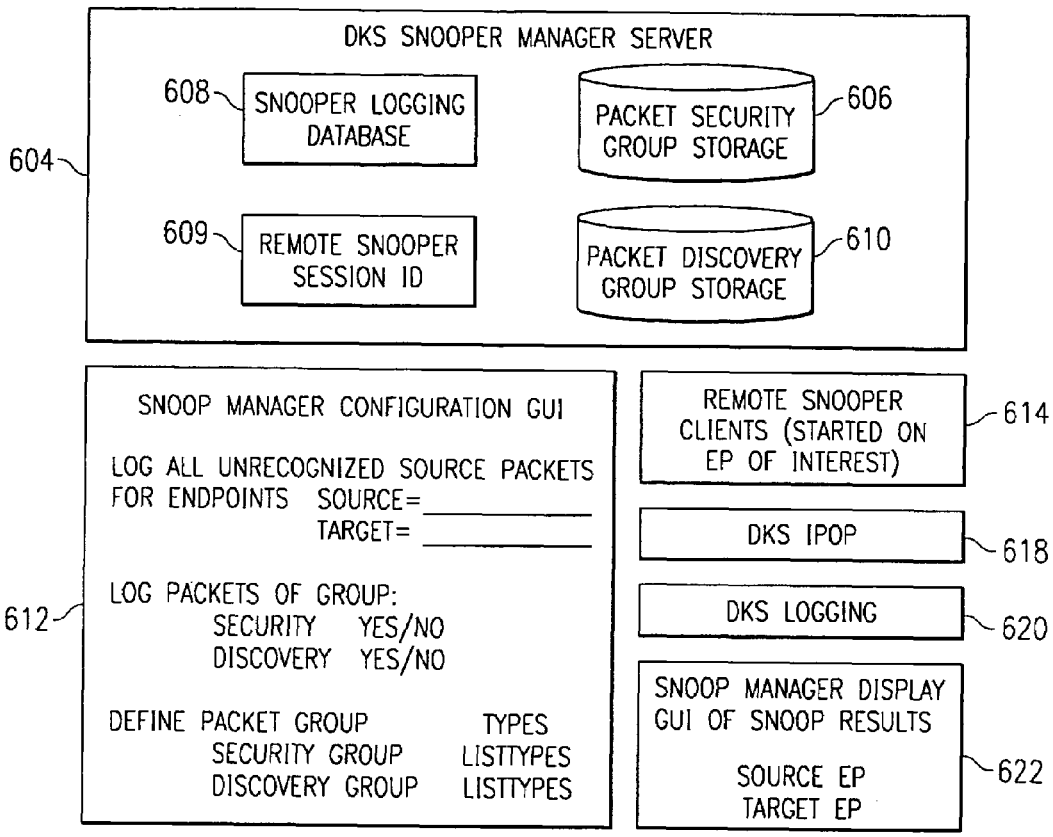
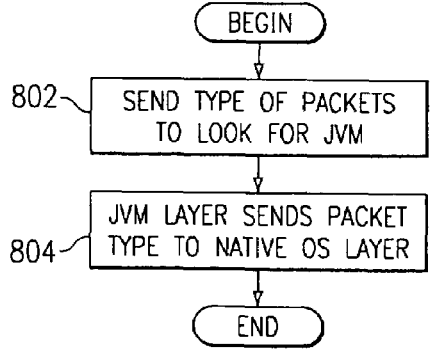
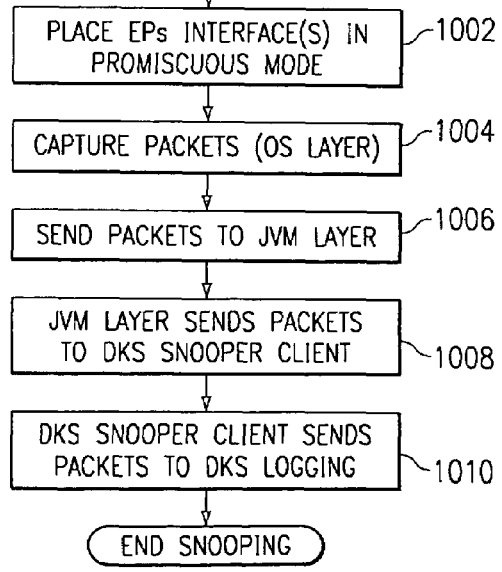

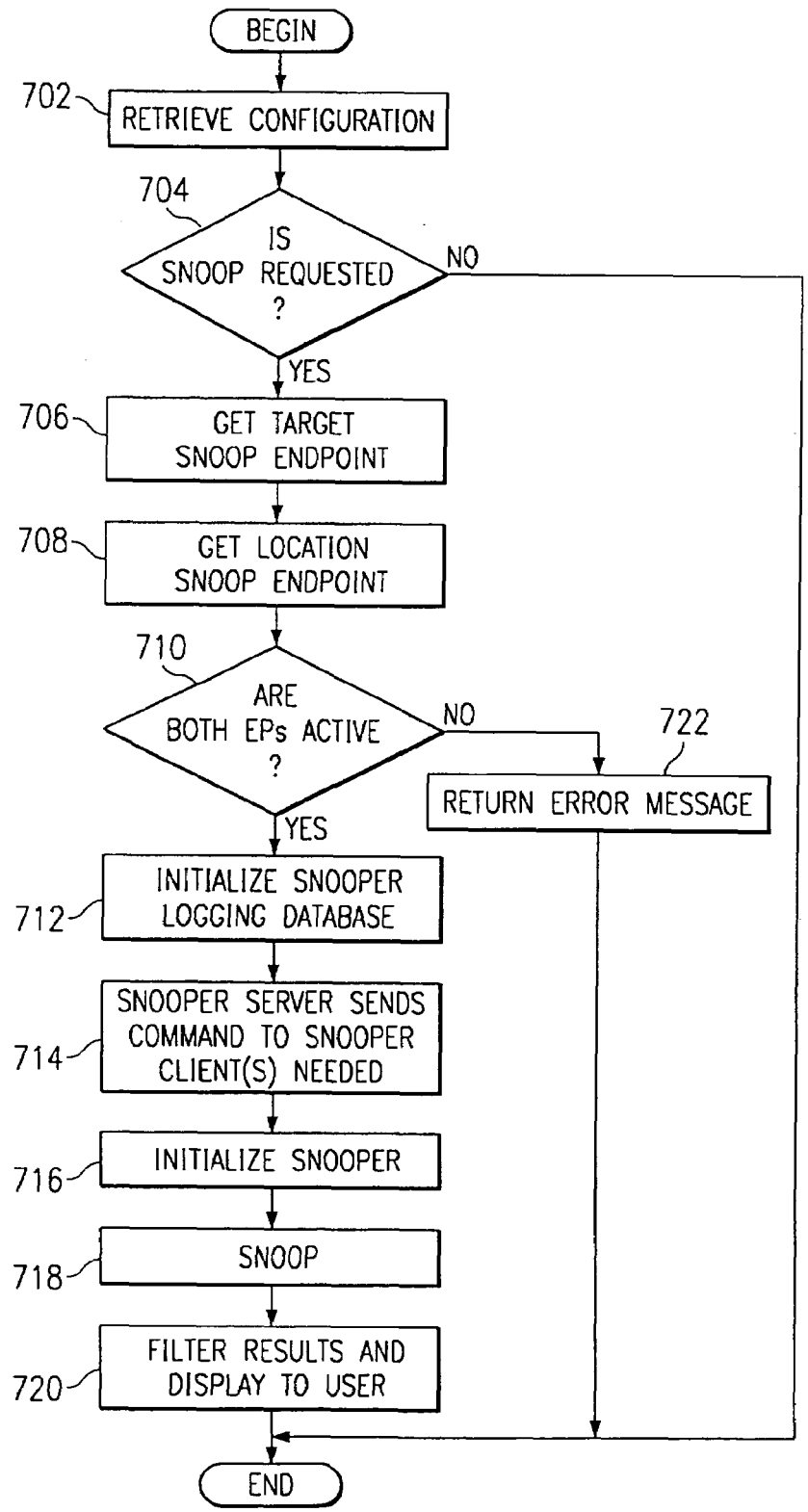

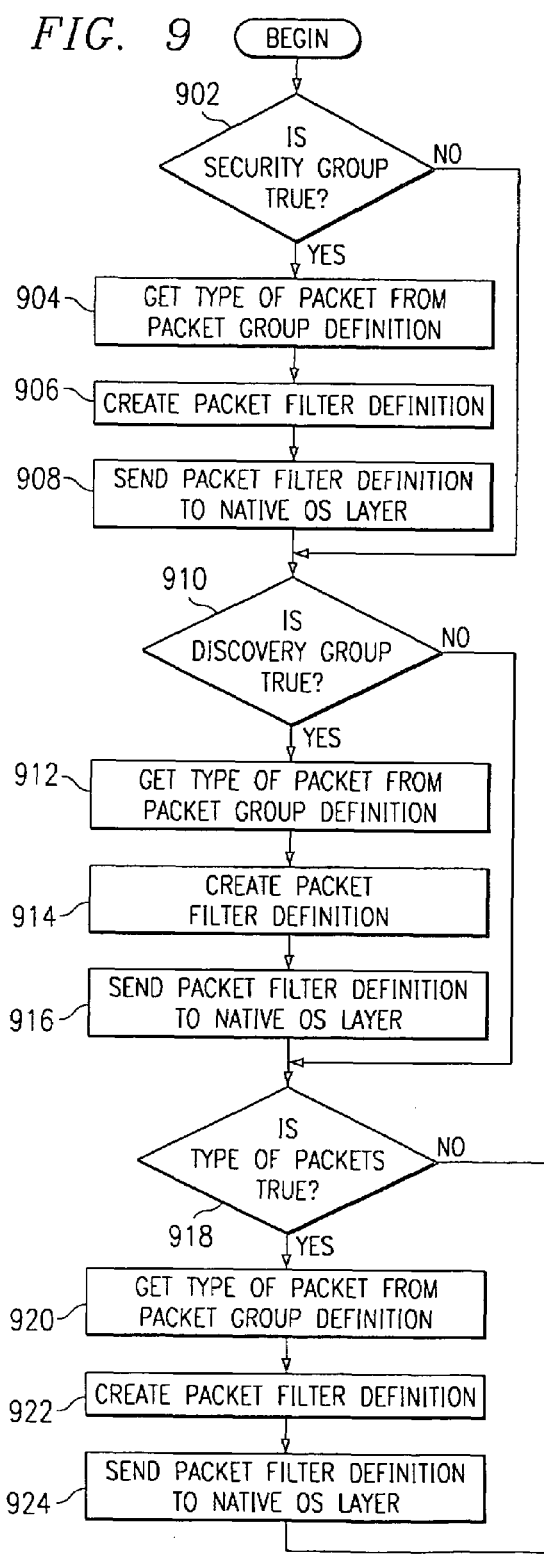
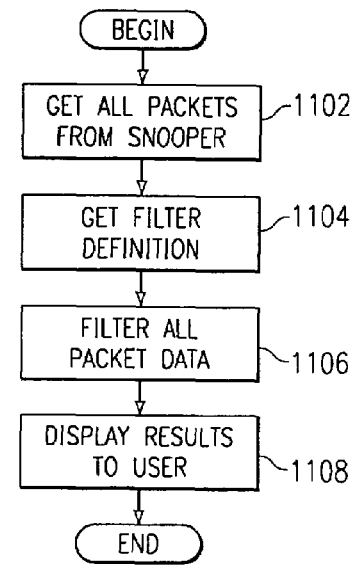
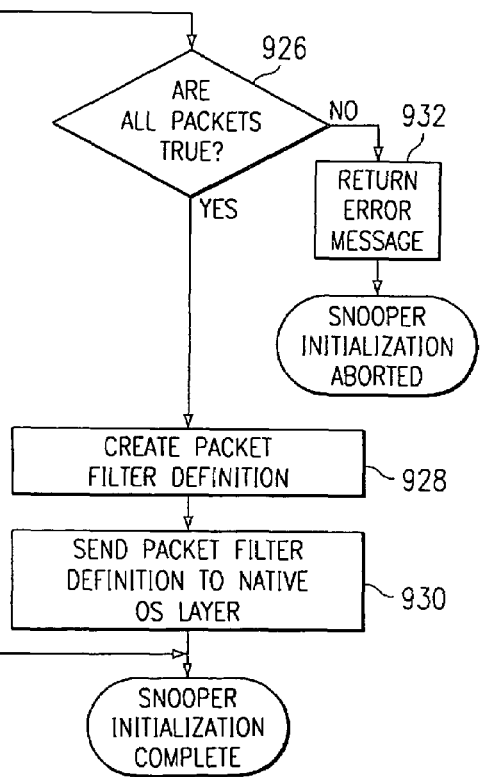

SIMPLIFIED NETWORK PACKET ANALYZER FOR DISTRIBUTED PACKET SNOOPER

CROSS REFERENCE TO RELATED APPLICATIONS

The present application is related to co-pending U.S. patent application Ser. No. 09/738,336 entitled "METHOD AND APPARATUS IN AN APPLICATION FRAMEWORK SYSTEM FOR PROVIDING A PORT AND NETWORK HARDWARE RESOURCE FIREWALL FOR DISTRIBUTED APPLICATIONS" filed even date herewith. The content of the above mentioned commonly assigned, co-pending U.S. Patent application is hereby incorporated herein by reference for all purposes.

BACKGROUND OF THE INVENTION

1. Field of the Invention

The present invention relates to an improved data processing system and, in particular, to a method and system for multiple computer or process coordinating. Still more particularly, the present invention provides a method and system for network resource management.

2. Description of Related Art

Network and Internet security issues have become major issues for businesses as businesses have become more reliant on computer systems in order to carry out their business plan. For example, many business computer systems have had the security or performance of their computer networks compromised as a result of "computer hackers." Some of these "hacks" have resulted in millions of dollars in lost revenue. In order to understand internet and network related security issues, it is helpful to have a basic working knowledge of Internet Protocol, and how it is used by all internet computers to communicate with each other.

Computer networking is built around several basic protocols. Internet Protocol or IP is the basis for all communications over the internet. IP is used by all computers on the internet to communicate with each other. When you use a web browser, your computer uses IP to establish connections to the web server. This works in reverse as well. Other computers on the internet can use IP to contact your computer.

Ports are used by a computer to control which service is accessed when establishing a connection. If you are communicating with Secure Design for example and you are sending e-mail, your computer establishes a connection to port 25 (SMTP) however if you are accessing a web page, you must connect to port 80 (http). Ports on a computer range from 1 to 65535. Ports under 1024 are reserved for system processes such as mail and web servers. Ports above 1024 are often used for outbound connections.

When establishing a connection to a server, your computer specifies the server address and the target port number. When the request is made, the server responds by allowing the connection or responding with a "port closed" message.

Port scanning is a method of probing a computer to see what ports are open. This is usually a brute force operation where one simply tries to establish a connection to each and every port on the target computer. When a connection is established, the caller makes note of the port number and continues on. The caller can then examine these ports later to see if any known security holes exist.

Even if a business is on a basic dialup internet account, it needs to take precautions to ensure your computer is not broken into. Even small businesses should not make the assumption that nobody will find its one little computer in the vast expanse of the internet. Many programs exist that will allow miscreants to automatically scan large blocks of internet addresses. Some only look for Windows file sharing ports, while others look for any open port.

One problem with port scanners as currently implemented is that it can only be determined whether a TCP/IP port is opened or closed. No other useful information, such as where port data is going or what the port data is. Another problem is that ports can be opened in software and then used for security holes. Furthermore, there is currently no method for controlling a port scanner in a distributed data processing system as well as no method for snooping the contents of data passing through ports that is dynamically configurable in a distributed data processing system.

Therefore, it would be desirable to have a packet snooper that is configurable to snoop various ports in a system for traffic generated by or to other specific ports within the network.

SUMMARY OF THE INVENTION

The present invention provides a method, system, apparatus, and computer program product are presented for a dynamically locatable packet analyzer spread across a distributed network of endpoints for determining packet generating applications. In particular, the analyzer determines which ports are being used by which applications in order to verify that only intended packets are being sent and received by endpoints. The analyzer also provides novice packet snooping by not requiring administrators to configure operating system specific, packet specific or port specific information. The analyzer also provides snooping per application type (i.e. security, discovery, etc.) on endpoints, rather than packet type or port only.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2B is a block diagram of a preferred system management framework illustrating how the framework functionality is distributed across the gateway and its endpoints within a managed region;

FIG. 2C is a block diagram of the elements that comprise the low cost framework (LCF) client component of the system management framework;

FIG. 2D is a diagram depicting a logical configuration of software objects residing within a hardware network similar to that shown in FIG. 2A;

FIG. 2G is a diagram depicting the logical relationships between components within a system management framework that includes two gateways supporting two endpoints;

FIG. 3 is a block diagram depicting components within the system management framework that provide resource leasing management functionality within a distributed computing environment such as that shown in FIGS. 2D–2E;

FIG. 4 is a block diagram showing data stored by a the IPOP (IP Object Persistence) service;

FIG. 5 is a block diagram showing the IPOP service in more detail;

FIG. 6 depicts a block diagram illustrating a snooper for a distributed data processing system in accordance with a preferred embodiment of the present invention;

FIG. 7 depicts a flowchart illustrating an exemplary program flow for snooping in accordance with a preferred embodiment of the present invention;

FIG. 8 depicts a flowchart illustrating an exemplary method of initializing a snooper on a snooper client in accordance with a preferred embodiment of the present invention;

FIG. 9 depicts a flowchart illustrating an exemplary method of initializing the Native OS layer of the snooper client(s) in accordance with a preferred embodiment of the present invention;

FIG. 10 depicts a flowchart illustrating an exemplary method for snooping from a snooper client in accordance with a preferred embodiment of the present invention; and FIG. 11 depicts a flowchart illustrating an exemplary process for filtering and displaying the results of the snoop operation in accordance with a preferred embodiment of the present invention.

DETAILED DESCRIPTION OF THE INVENTION

Figure 1A:
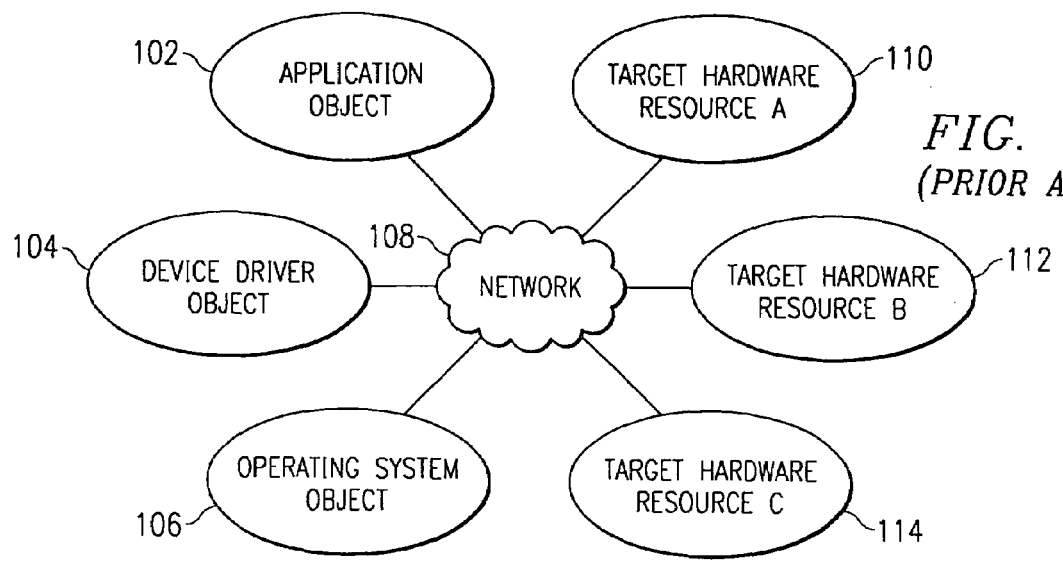
FIG. 1A is a diagram depicting a known logical configuration of software and hardware resources.

With reference now to FIG. 1A, a diagram depicts a known logical configuration of software and hardware resources. In this example, the software is organized in an object-oriented system. Application object 102, device driver object 104, and operating system object 106 communicate across network 108 with other objects and with hardware resources 110–114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 1B:
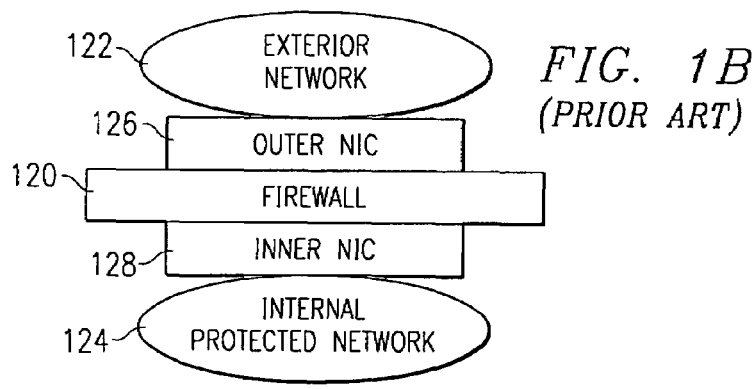
FIG. 1B is a block diagram depicting a known configuration of software and/or hardware network resources.

With reference now to FIG. 1B, a block diagram depicts a known configuration of software and/or hardware network resources. A computer-type device is functioning as firewall 120, which is usually some combination of software and hardware, to monitor data traffic from exterior network 122 to internal protected network 124. Firewall 120 reads data received by network interface card (NIC) 126 and determines whether the data should be allowed to proceed onto the internal network. If so, then firewall 120 relays the data through NIC 128. The firewall can perform similar processes for outbound data to prevent certain types of data traffic from being transmitted, such as HTTP (Hypertext Transport Protocol) Requests to certain domains.

More importantly for this context, the firewall can prevent certain types of network traffic from reaching devices that reside on the internal protected network. For example, the firewall can examine the frame types or other information of the received data packets to stop certain types of information that has been previously determined to be harmful, such as virus probes, broadcast data, pings, etc. As an additional example, entities that are outside of the internal network and lack the proper authorization may attempt to discover, through various methods, the topology of the internal network and the types of resources that are available on the internal network in order to plan electronic attacks on the network. Firewalls can prevent these types of discovery practices.

The present invention provides a methodology for discovering available resources and operating a framework for leasing these resources in a fair yet distributed manner. The manner in which the lease management is performed is described further below in more detail after the description of the preferred embodiment of the distributed computing environment in which the present invention operates.

Figure 2A:
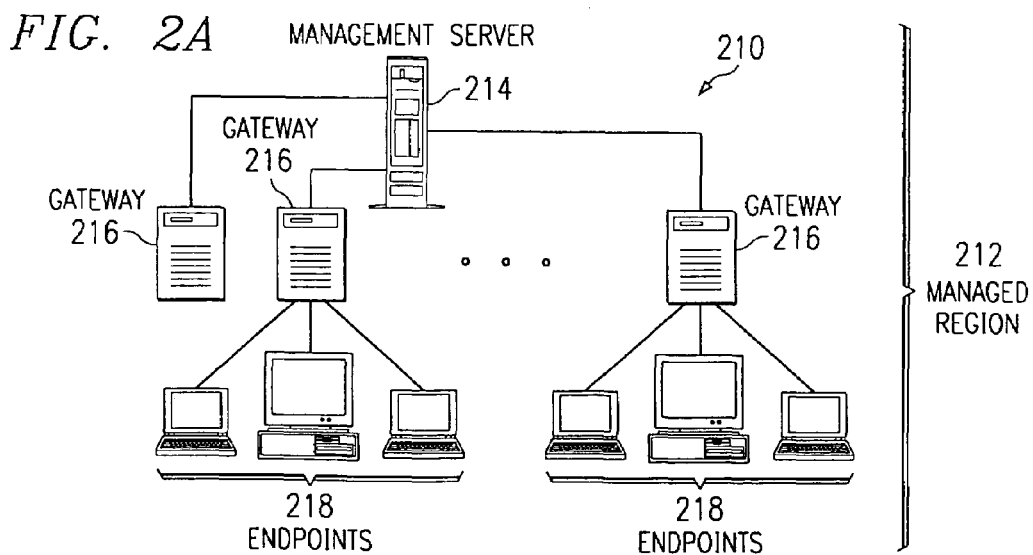
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

With reference now to FIG. 2B, each gateway machine 216 runs a server component 222 of a system management framework. The server component 222 is a multi-threaded runtime process that comprises several-components: an object request broker (ORB) 221, an authorization service 223, object location service 225 and basic object adaptor (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a NIC, so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Preferably, the server and each of the gateways is a distinct computer. For example, each computer may be a RISC System/6000™ (a reduced instruction set or so-called RISC-based workstation) running the AIX (Advanced Interactive Executive) operating system. Of course, other machines and/or operating systems may be used as well for the gateway and server machines.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1A, executes on the endpoints. Endpoints 230 and 231 support application objects 232–233, device driver objects 234–235, and operating system objects 236–237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by in central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
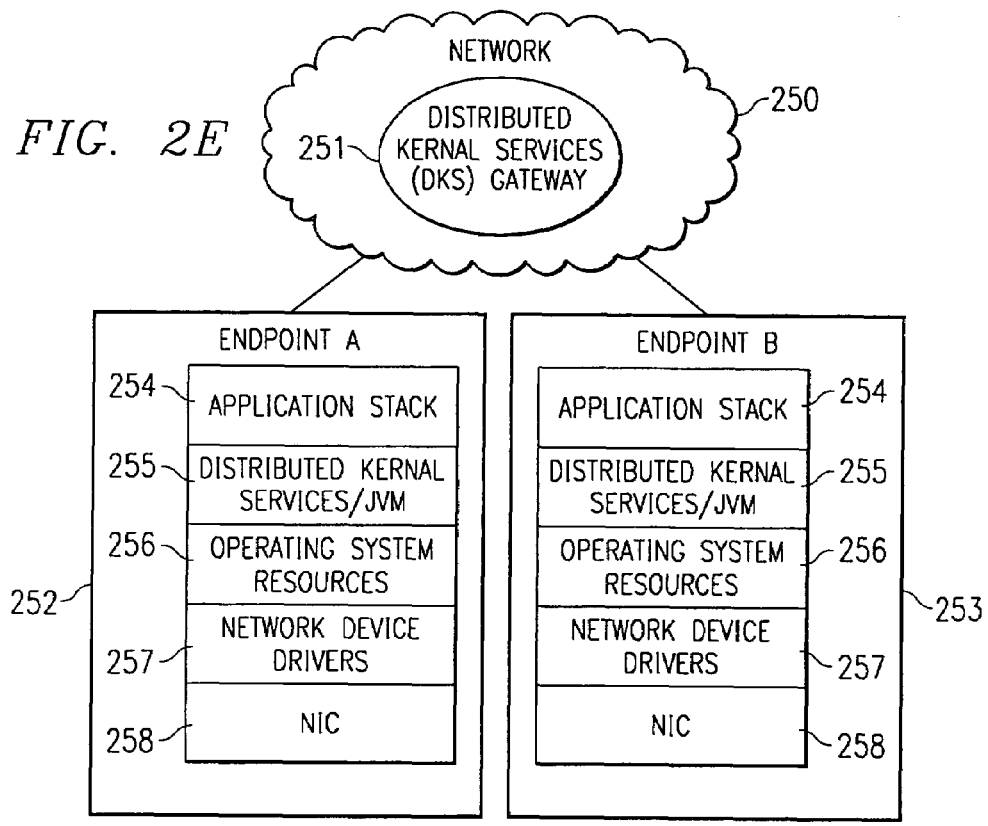
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
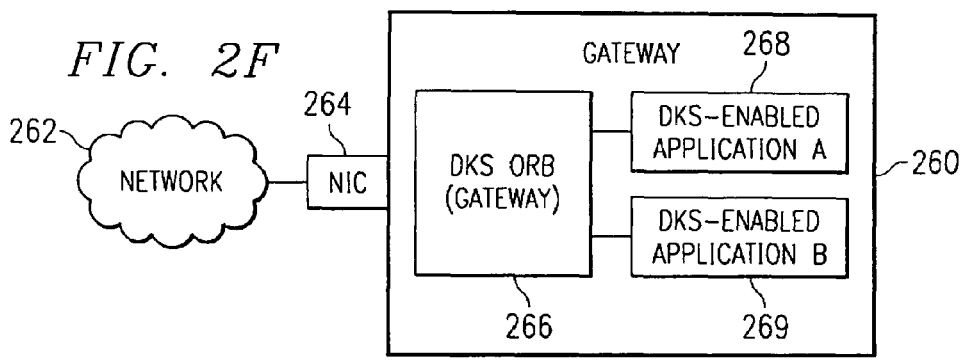
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing leases on system resources within a distributed computing environment. A resource is a portion of a computer system's physical units, a portion of a computer system's logical units, or a portion of the computer system's functionality that is identifiable or addressable in some manner to other physical or logical units within the system.

In the present invention, consumers of resources can obtain leases on consumable resources such that the resources are made available in a timely yet equitable manner. Resources can be restricted during the lease period. For example, an application can obtain a lease for a certain amount of bandwidth for a requested period of time, and the lessee is notified when it must reduce its bandwidth. The preferred embodiment is described in more detail in the following description of the remaining figures.

With reference now to FIG. 3, a block diagram depicts components within the system management framework that provide resource leasing management functionality within a distributed computing environment such as that shown in FIGS. 2D–2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NELS) 306, IP Object Persistence (IPOP) service 308, and Gateway Service 310. Lease management server 312 also operates within ORB 304. Alternatively, lease management server 312 can be permanently implemented as part of the Gateway Service.

The Gateway Service processes action objects, which are explained in more detail below, and directly communicates with endpoints or agents to perform management operations. The gateway receives events from resources and passes the events to interested parties within the distributed system. The NELS works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP Service can be used directly by certain components and applications when higher performance is required or the location independence provided by the gateways and action objects is not desired. A Metadata Service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that requests leases for utilizing object-oriented resources found within the distributed computing environment. Endpoint 302 contains target resource provider object or application 326 that services the requests from DKS-enabled application 324. The lease requests are initiated through lease management client 328. Lease management server 312 at the gateway eventually receives and manages the lease requests. A set of DKS services 330 and 334 support each particular endpoint.

Applications require some type of insulation from the specifics of the operations of gateways. In the DKS environment, applications create action objects that encapsulate command which are sent to gateways, and the applications wait for the return of the action object. Action objects contain all of the information necessary to run a command on a resource. The application does not need to know the specific protocol that is used to communicate with the resource. The application is unaware of the location of the resource because it issues an action object into the system, and the action object itself locates and moves to the correct gateway. The location independence allows the NELS to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling managed object as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. AOIP objects are the primary vehicle that establishes a connection between an application and a designated IP endpoint using a gateway or stand-alone service. In addition, the Action Object SNMP (AOSnmp) Class is also a subclass of the Action Object Class. AOSnmp objects are the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NELS; a mechanism by which the action object can use the ORB to transport itself to the selected gateway; a mechanism by which to communicate with the SNMP stack in a stand-alone mode; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An action object IP may be capable of running a command from inception or waiting for a future command. A program that creates an AOIP object must supply the following elements: address of endpoints; function to be performed on the endpoint, class, or object; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NELS service finds a route (data path) to communicate between the application and the appropriate endpoint. The NELS service converts input to protocol, network address, and gateway location for use by action objects. The NELS service is a thin service that supplies information discovered by the IPOP service. The primary roles of the NELS service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NELS service to resolve the network address and define the route to the endpoint in that network.

One of the following is passed to the action object to specify a destination endpoint: an EndpointAddress object; a fully decoded NetworkAddress object; and a string representing the IP address of the IP endpoint. In combination with the action objects, the NELS service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NELS service to have the flexibility to decide the best protocol to reach an endpoint. On return from the NELS service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NELS service determines which endpoints are managed by which gateways. When the appropriate gateway is identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the action object IP fails to execute an action object on the target gateway, NELS is consulted to identify an alternative path for the command. If an alternate path is found, the action object IP is transported to that gateway and executed. It may be assumed that the entire set of commands within one action object IP must fail before this recovery procedure is invoked.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological (topo) objects for facilitating the leasing of resources at IP endpoints and the execution of action objects. Information within IPOP service database 402 allows applications to generate action objects for resources previously identified as IP objects through a discovery process across the distributed computing environment. FIG. 4 merely shows that the topo objects may be separated into a variety of categories that facilitate processing on the various objects. The separation of physical network categories facilitates the efficient querying and storage of these objects while maintaining the physical network relationships in order to produce a graphical user interface of the network topology.

With reference now to FIG. 5, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own scope, and every IP driver is assigned to a topology manager within topology service 504, which can serve may than one IP driver. Topology service 504 stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

IPOP service 510 provides a persistent repository 512 for discovered IP objects; persistent repository 512 contains attributes of IP objects without presentation information. Discovery controller 506 detects IP objects in Physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 532 serves as central control of all other IP driver components. One or more IP drivers can be deployed to provide distribution of IP discovery and promote scalability of IP driver subsystem services in large networks where a single IP driver subsystem is not sufficient to discover and monitor all IP objects. Each IP discovery driver performs discovery and monitoring on a collection of IP resources within the driver's "scope". A driver's scope is simply the set of IP subnets for which the driver is responsible for discovering and monitoring. Network administrators generally partition their networks into as many scopes as needed to provide distributed discovery and satisfactory performance.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP Service manages discovered IP objects; to do so, the IPOP Service uses a distributed database in order to efficiently service query requests by a gateway to determine routing, identity, or a variety of details about an endpoint. The IPOP Service also services queries by the Topology Service in order to pictorial display a physical network or map them to a logical network, which is a subset of a physical network that is defined programmatically or by an administrator. IPOP fault tolerance is also achieved by distribution of IPOP data and the IPOP Service among many Endpoint ORBs.

With reference now to FIG. 6, a block diagram illustrating a snooper for a distributed data processing system is depicted in accordance with a preferred embodiment of the present invention. Snooper 600 includes a DKS snooper manager 604, a snoop manager configuration graphical user interface (GUI) 612, remote snooper clients 614, a DKS gateway/NEL 616, a DKS IPOP 618, DKS logging 620, and a snoop manager display GUI 622.

The snoop manager configuration GUI 612 allows an administrator to determine which packet(s) to analyze. The DKS snoop manager may be configured through snoop manager configuration GUI 612 as to the type of packet by, for example, analyzing for a security attack or for IP discover phase. Alternatively, the administrator may configure the snoop system 600 to get all packets flowing through specified endpoints. The snoop manager configuration GUI 612 also allows the administrator to pick an endpoint to start snooping and an endpoint on which to place a snooper.

The use of the snoop manager configuration GUI allows management of the snooper to be easier such that novice administrators may utilize the snoop system 600. This is provides an advantage not seen in prior art snooper since prior art snoopers require advanced skill to understand what should be snooped and what results were obtained from the snooping. Allowing the administrator to select endpoints within the distributed network is advantageous since the number of HOPS (e.g. number of systems between a source endpoint and a target endpoint) is large. Therefore, strategic placement of endpoints can eliminate a large amount of unimportant packet data traffic from the snooper. The present snooping system also allows an administrator to turn off as previously explained in application leases for endpoint network resource or on DKS applications in an effort to obtain snoop data without including packets generated from certain DKS applications. This also allows an administrator to turn on a particular application with "bait data" for a potential security attacker. Also, by strategic placement of endpoints, a network administrator may diagnose network problems.

Snooper Manager Server 604 controls the execution of Remote Snooper Clients 614, including the starting and stopping of packet snooping, initialization of clients with pertinent packet types, communication of remote clients and the Snooper Logging Database 608. The Snooper Manager Server also retrieves the data entered by the Administrator in the Snoop Manager Configuration GUI 612. When there is a request to start a Remote Client on an Endpoint, (1) a remote snooper session id 609 is generated, (2) the packet specific data is derived from the GUI attributes for that endpoint and the stored packet group information 606, 610 and (3) the logging configuration is gathered and the appropriate DKS Logging component 620 initialized.

Once the source and the target endpoint are retrieved 612, the DKS Snoop manager determines route between the two endpoints using DKS IPOP Component 618. With this list of EPs, a Remote Snooper Client is automatically started on all the EPs of interest 614.

The results of a Remote Snooper Session are displayed on a display GUI 622 of the Source and Target EPs. Different results can be obtained using different locations for the Snooper EP. The Source EP and target EP combination simplifies the administrators analysis of a multiple Endpoints since the route between two endpoints can implies multiple endpoints between the two. Note the location of the remote snooper(s) is hidden from the administrator, but the results are as if you have placed snoopers along the whole route. This greatly simplifies the analysis needed to determine where a security attack has occurred (which endpoint is incubated the virus or point of entry). In addition, a route based snooper can show the distribution of packet types across multiple endpoints in large scale installations.

With reference now to FIG. 7, a flowchart illustrating an exemplary program flow for snooping is depicted in accordance with a preferred embodiment of the present invention. To begin, the snoop manager configuration GUI 612 receives the administrators configuration information (step 702). Once the configuration is received, the snooper determines whether snooping has been requested (step 704). If snooping has been requested, then the snooper manager 604 determines the target snoop endpoint (step 706) and the location snoop endpoint (step 708). The target snoop endpoint is the location that packets that are being snooped are being delivered to and the location endpoint is the location of the snooper watching packets going in and out to the target endpoint. The snooper manager 604 then determines whether both endpoints are active (step 710). If one or both of the endpoints are not active, then an error message is returned to the administrator (step 722) and snooping ends.

If both endpoints are active, then the snooper server 604 initializes the snooper logging database (step 712) and sends commands to the snooper client(s) 614 that are needed (step 714). The snooper manager 604 then initializes the snooper on the client(s) (step 716). Each snooper client then begins to snoop as directed by the administrator (step 718). Once the snooping data has been logged into DKS logging database 608, the results are filtered and displayed to a user (step 720).

With reference now to FIG. 8, a flowchart illustrating an exemplary method of initializing a snooper on a snooper client is depicted in accordance with a preferred embodiment of the present invention. This flowchart shows in more detail the actions sufficient to perform steps 712–714 in FIG. 7. To initialize the snooper within each snooper client 614, the snooper manager 604 sends the type of packets to look for to the JVM of the snooper client(s) 614 (step 802). The JVM of the snooper client(s) 614 then sends the packet type to the Native OS layer of the snooper client(s) 614 (step 804).

With reference now to FIG. 9, a flowchart illustrating an exemplary method of initializing the Native OS layer of the snooper client(s) is depicted in accordance with a preferred embodiment of the present invention. This flowchart shows in more detail the actions sufficient to perform step 804 in FIG. 8. To begin, it is determined whether the administrator selected to log packets by security group (step 902). If the administrator did select to log packets by the security group, then the JVM gets the type of packets from the packet group definition (step 904). A packet filter definition is created (step 906) and sent to the native OS layer (step 908). If the administrator did not select to group packets by security group or after initializing the Native OS layer for security groups, it is determined whether the administrator has selected to group packets by discovery group (step 910). If the administrator has selected to group packets by discover group, then the JVM gets the type of packets from the packet group definition for discovery group (step 912). A packet filter definition for the discovery group is created (step 912) and sent to the native OS layer (step 914).

If the administrator did not select discovery groups or after completion of the initialization of the Native OS layer for discovery groups, it is determined whether the administrator selected the type of packets for the groups (step 918). If the administrator did select packet group types, then the JVM gets the type of packet from the packet group definition (step 920) and creates the packet filter definition (step 922). The JVM then sends the packet filter definition to the Native OS layer (step 924) at which point the snooper initialization is complete.

If the administrator did not selected packet types, then it is determined whether the administrator has selected all packet types (step 926). If the administrator has selected all packet types, then a packet filter definition defining the packet type as all packet types is created (step 928). The packet filter definition is then sent to the Native OS layer (step 930) at which point the snooper initialization of the snooper client(s) 614 is complete. If the administrator has not selected all packet types (step 926), then an error message is returned to the administrator stating that snooper initialization has been aborted (step 932) for failure to select a packet filter definition.

With reference now to FIG. 10, a flowchart illustrating an exemplary method for snooping from a snooper client is depicted in accordance with a preferred embodiment of the present invention. This flowchart shows in more detail the actions of step 718 in FIG. 7. To snoop, the endpoints interface(s) are placed in promiscuous mode (step 1002). Promiscuous mode is used to passively capture packets local to its own physical network. The client snooper(s) 614 then capture the packets at the OS layer as the packets pass the endpoints (step 1004). The OS layer of the client snooper(s) then send the captured packets to the JVM layer (step 1008) and the JVM layer sends the packets to the DKS snooper client (step 1008). The DKS snooper client then sends the packets to the DKS logging 620 (step 1010) which store the packet data in a logging database for later retrieval.

With reference now to FIG. 11, a flowchart illustrating an exemplary process for filtering and displaying the results of the snoop operation is depicted in accordance with a preferred embodiment of the present invention. This flowchart shows in more detail the actions described in step 720 in FIG. 7. To begin, the filter receives all the packets from the snooper client (step 1102). The filter definition is then retrieved (step 1104) and all packet data received from the snooper is filtered (step 1106). Once the packet data has been filtered, the results are displayed to the user, using for example, snoop manager display GUI 622 in FIG. 6.

Filtering the snoop information allows junior administrators to obtain answers to basic information regarding the networked computing system. Also, using a snooper logging database allows logging of snoop data to be distributed for later analysis. The organization of the packet database is such that convenient queries can be done based on packet groups since they are stored in separate database tables. Predefined SQL 608 can be used to quickly sort the correct packet types of interest for junior administrators. In addition to snoop data, Predefined SQL 608 also stores convenient pre-defined packet SQL queries for use by administrators against the database. Distributed logging databases allow large amounts of data to be analyzed by local or remote administrators.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include storage media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for analyzing network packets, the method comprising:
   receiving snoop configuration information;
   configuring an endpoint and a source endpoint;
   initialize a snooper on at least one client; and
   snooping, by the at least one client, data packets transmitted through the endpoint originating from the source endpoint and transmitted through the endpoint destined for the source endpoint, wherein the step of initializing the snooper on the at least one client comprises:
      creating, by a java virtual machine within the snooper client, a packet filter definition corresponding to the packet type selected by a user;
      sending the packet filter definition to the native operating system layer of the snooper client.

2. A computer program product in a computer readable storage media for use in a data processing system for analyzing network packets, the computer program product comprising:
   first instructions for receiving snoop configuration information;
   second instructions for configuring an endpoint and a source endpoint;
   third instructions for initialize a snooper on at least one client; and
   fourth instructions for snooping, by the at least one client, data packets transmitted through the endpoint originating from the source endpoint and transmitted through the endpoint destined for the source endpoint, wherein the third instructions for initializing the snooper on the at least one client comprises:
      fifth instructions for creating, by a java virtual machine within the snooper client, a packet filter definition corresponding to the packet type selected by a user;
      sixth instructions for sending the packet filter definition to the native operating system layer of the snooper client.

3. A system for analyzing network packets, the system comprising:
   first means for receiving snoop configuration information;
   second means for configuring an endpoint and a source endpoint;
   third means for initialize a snooper on at least one client; and
   fourth means for snooping, by the at least one client, data packets transmitted through the endpoint originating from the source endpoint and transmitted through the endpoint destined for the source endpoint, wherein the third means for initializing the snooper on the at least one client comprises:
      fifth means for creating, by a java virtual machine within the snooper client, a packet filter definition corresponding to the packet type selected by a user,
      sixth means for sending the packet filter definition to the native operating system layer of the snooper client.

4. A system for network packet analyzing, comprising:
   at least one remote snooper client;
   a snooper manager server controlling execution of the at least one remote snooper client, the snooper manager server comprising a snooper logging database;
   a java virtual machine component of a snooper in the at least one remote snooper client; and
   a native operating system component of the snooper in the at least one remote snooper client; wherein
   the snooper is configurable by the snooper manager to snoop only certain types of data packets.

* * * * *